(12) United States Patent
Becquet et al.

(10) Patent No.: US 11,082,136 B2
(45) Date of Patent: *Aug. 3, 2021

(54) METHOD FOR COMMUNICATING BETWEEN AT LEAST ONE FIRST SYSTEM AND AT LEAST ONE SECOND SYSTEM

(71) Applicant: Valeo Systemes de Controle Moteur, Cergy Saint Christophe (FR)

(72) Inventors: Valéry Becquet, Molliens-Dreuil (FR); Olivier Garot, Vaureal (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,740

(22) Filed: May 7, 2020

(65) Prior Publication Data

US 2020/0280376 A1  Sep. 3, 2020

Related U.S. Application Data

(63) Continuation of application No. 14/366,443, filed as application No. PCT/FR2012/052989 on Dec. 19, 2012, now Pat. No. 10,673,540.

(30) Foreign Application Priority Data

Dec. 19, 2011  (FR) ..................................... 1161961

(51) Int. Cl.
*H04B 15/00* (2006.01)
*G06F 13/42* (2006.01)
(Continued)

(52) U.S. Cl.
CPC ......... *H04B 15/00* (2013.01); *G06F 13/4282* (2013.01); *G06F 13/4291* (2013.01);
(Continued)

(58) Field of Classification Search
None
See application file for complete search history.

(56) References Cited

U.S. PATENT DOCUMENTS 5,675,811 A * 10/1997 Broedner ............ G06F 13/4291
710/104
5,793,993 A * 8/1998 Broedner ............ G06F 13/4291
340/12.31

(Continued)

*Primary Examiner* — Gregory B Sefcheck
*Assistant Examiner* — Suk Jin Kang
(74) *Attorney, Agent, or Firm* — Osha Bergman Watanabe & Burton LLP

(57) ABSTRACT

A method for communicating between a first system and a second system using a full-duplex synchronous serial link capable of simultaneously routing between both systems is disclosed. The data involved includes at least one message from the first system to the second, at least one message from the second system to the first, and a clock signal. The method involves the second system receiving a message and a clock signal sent by the first system, delayed and substantially in phase, the second system sends a message to the first system, the clock signal received by the second system is sent back to the first system with the message sent by the second system, and the first system receives the message sent by the second system and the sent-back clock signal, delayed and substantially in phase.

10 Claims, 2 Drawing Sheets

Figure 1:
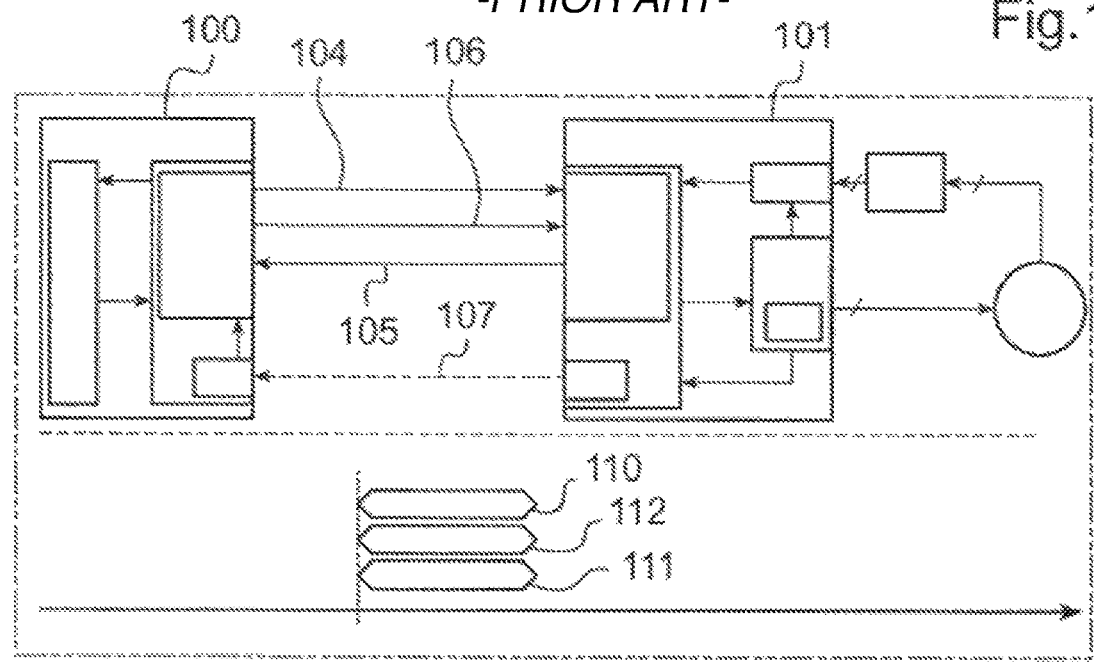

(51) Int. Cl.
*H04L 5/14* (2006.01)
*H04L 25/02* (2006.01)

(52) U.S. Cl.
CPC .............. *H04L 5/14* (2013.01); *H04L 5/1469* (2013.01); *H04L 25/0266* (2013.01); *H04L 25/0272* (2013.01)

(56) References Cited

U.S. PATENT DOCUMENTS

| | | | | |
|---|---|---|---|---|
| 5,812,796 A * | 9/1998 | Broedner | ............ | G06F 13/4291 710/260 |
| 2002/0120795 A1* | 8/2002 | Charlier | ............ | G06F 13/4291 710/33 |
| 2005/0108571 A1* | 5/2005 | Lu | ............ | H04L 63/0853 726/4 |
| 2005/0239503 A1* | 10/2005 | Dressen | ............ | H04L 25/45 455/557 |
| 2007/0033466 A1* | 2/2007 | Buchmann | ............ | H04L 7/005 714/731 |
| 2008/0317106 A1* | 12/2008 | Leung | ............ | G06F 13/4072 375/220 |
| 2009/0027243 A1* | 1/2009 | Leung | ............ | H01L 24/49 341/100 |
| 2009/0103380 A1* | 4/2009 | Pekny | ............ | G06F 3/0679 365/201 |
| 2010/0061497 A1* | 3/2010 | Buchmann | ............ | H04L 7/005 375/371 |
| 2010/0138576 A1* | 6/2010 | Goerlich | ............ | G06F 13/4291 710/110 |
| 2010/0150338 A1* | 6/2010 | Nguyen | ............ | G06F 13/4291 379/412 |
| 2010/0199007 A1* | 8/2010 | Kapelner | ............ | G06F 13/423 710/110 |
| 2011/0060856 A1* | 3/2011 | Huang | ............ | G06F 13/4291 710/110 |
| 2011/0222682 A1* | 9/2011 | Ransijn | ............ | H04M 19/001 379/390.01 |
| 2011/0227773 A1* | 9/2011 | Alley | ............ | H03M 3/392 341/155 |
| 2011/0289248 A1* | 11/2011 | Djabbari | ............ | G06F 13/4256 710/110 |
| 2012/0072628 A1* | 3/2012 | Crockett | ............ | G06F 13/4291 710/110 |
| 2012/0079138 A1* | 3/2012 | Obkircher | ............ | G06F 13/4291 710/15 |
| 2012/0124446 A1* | 5/2012 | Pekny | ............ | G06F 3/0679 714/756 |
| 2012/0131247 A1* | 5/2012 | Mok | ............ | G06F 13/4291 710/110 |
| 2012/0166677 A1* | 6/2012 | Obkircher | ............ | G06F 13/4291 710/3 |
| 2012/0275527 A1* | 11/2012 | Douglass | ............ | H04L 25/0272 375/257 |
| 2013/0135041 A1* | 5/2013 | Slupsky | ............ | H01L 23/58 327/564 |
| 2013/0138879 A1* | 5/2013 | Kulkarni | ............ | G06F 13/42 711/114 |
| 2013/0163688 A1* | 6/2013 | Calvin | ............ | H04B 5/005 375/272 |
| 2014/0075072 A1* | 3/2014 | Alley | ............ | G06F 13/4291 710/110 |
| 2014/0208070 A1* | 7/2014 | Alley | ............ | G06F 15/17 712/31 |
| 2014/0266373 A1* | 9/2014 | Goswami | ............ | H03K 3/011 327/262 |
| 2014/0331105 A1* | 11/2014 | Pekny | ............ | G06F 3/0629 714/764 |
| 2017/0097901 A1* | 4/2017 | Pekny | ............ | G06F 12/14 |

* cited by examiner

*-PRIOR ART-*

*-PRIOR ART-*

METHOD FOR COMMUNICATING BETWEEN AT LEAST ONE FIRST SYSTEM AND AT LEAST ONE SECOND SYSTEM

CROSS-REFERENCES TO RELATED APPLICATIONS

This Application is a Continuation of application Ser. No. 14/366,443 filed on Jun. 18, 2014, which is a National Stage Entry of PCT/FR2012/052989. Application PCT/FR2012/052989 claims priority from Application 1161961 filed on Dec. 19, 2011 in France. The entire contents of application Ser. No. 14/366,443, Application PCT/FR2012/052989, and Application 1161961 are incorporated herein by reference in their entirety.

The present invention relates to communication between at least one first system and at least one second system using a full-duplex synchronous serial link.

In the sense of the present invention, a full-duplex link is a link allowing a bidirectional and simultaneous exchange of data.

The invention applies in particular, but not exclusively, to communication between systems involved in driving electronic switches such as transistors.

The first and the second system are for example embedded on a hybrid or electric motor vehicle and can be involved in the driving of an inverter interposed between the battery and the electric motor of the vehicle powered by this battery. The inverter can also, or in a variant, be part of an inverter/charger circuit capable of being connected to the electrical network to charge the battery.

It is known practice to use a full-duplex synchronous serial link to communicate between two systems.

FIG. 1 represents a known example of communication according to the SPI (Serial Peripheral Interface) protocol developed by Motorola®. A full-duplex synchronous serial link with a speed of 20 Mbits/s is established between one first system 100 and one second system 101 to route data from one system to the other. In the example represented, the first system 100 comprises a microcontroller and the second system 101 comprises a programmable logic circuit (also called FPGA). This link comprises three wires 104, 105 and 106 respectively serving to route one or more messages 110 from the first system 100 to the second system 101, to route one or more messages 111 from the second system 101 to the first system 100 and to route a clock signal 112 generated by the first system 100.

At each wire, the routing induces in the data a delay that can be substantially constant from one wire to the other. Where applicable, as represented in FIG. 1, a fourth wire 107 can be provided to allow the second system 101 to clock the communication sequences.

The delay induced by the routing of data over the link must be compatible with the speed that one wishes to obtain for the full-duplex communication, for example a speed of at least 5 Mbits/s, particularly 10 Mbits/s, or even 20 Mbits/s.

The longer each wire is, the longer the delay. When the length of the wire is not too great, the delay induced by the link can become long when the latter crosses galvanic isolation interposed between the first system and the second system.

Figure 2:
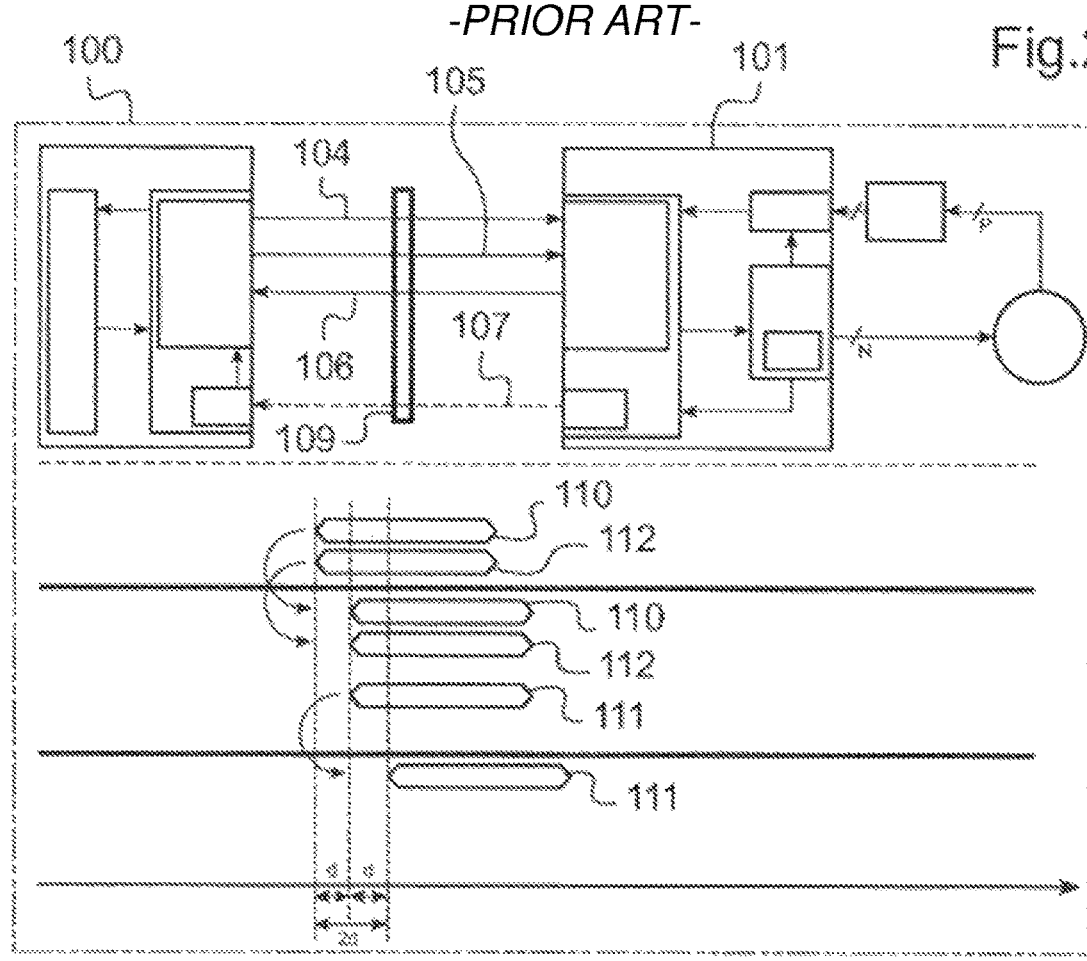

FIG. 2 represents such a situation. The installation of galvanic isolation 109 can be desirable in the automotive applications mentioned above to protect the extra-low voltage components (ELV according to the IEC 60038 standard, i.e. having a voltage below 50V in alternating current and below 120V in direct current) from the low voltages (LV according to the IEC 60038 standard, i.e. lying between 50 and 1000V in alternating current and lying between 120 and 1500V in direct current) required for the powering of the battery or of the electric motor. This galvanic isolation 109 is for example obtained using a transformer.

The crossing by each wire 104 to 106 of the link of the isolation 109 is liable to delay the data routed over the link by a delay with a value close to a quarter of the period of the clock signal for the desired speed. In the example described, the data can be delayed by 20 ns to 60 ns whereas the clock signal has a period lying between 50 ns and 200 ns.

This delay, whether it is due to the presence of the galvanic isolation 109, the length of the link, or even both, affects the operation of the link since the first system 100 does not receive the message from the second system 101 in phase with the clock signal 112 that it generates, so that it cannot correctly sample this message. The second system 101 itself receives a message 110 from the first system 100 that is no longer in phase with the clock signal 112 that it also receives, in such a way that it cannot correctly sample the message 110 that it receives.

The use in the case in FIG. 2 of galvanic isolation 109 with several channels (one channel for each wire) can allow the second system 101 to correctly sample the messages that it receives from the first system 100. Indeed, given that each channel of the isolation induces substantially the same delay on the routed data, the second system 101 receives the message 110 sent by the first system 100 substantially in phase with the clock signal 112.

On the other hand, as represented in FIG. 2, the message 111 sent by the second system 101 and the clock signal 112 are not in phase, so that the problem persists from the point of view of the first system 100.

One possible solution is to reduce the speed of the communication, for example to a value below 5 Mbits/s, and/or to offset the sending of the messages by the slave system.

However, such a solution does not allow high-speed communications, which are desirable in many applications, including the automotive field.

The present invention has the aim of making it possible to produce a full-duplex synchronous serial link allowing high speeds, particularly above 5 Mbits/s, for example in the order of 10 Mbits/s, or even in the order of 20 Mbits/s, although this link induces delays on the data routed by the latter.

The invention manages to achieve this, according to one of its aspects, using a method for communicating between at least one first system and at least one second system by way of a full-duplex synchronous serial link being able to simultaneously route between said systems data comprising: at least one message from the first system to the second system, at least one message from the second system to the first system and a clock signal,
a method in which:
  the second system receives a message and a clock signal sent by the first system, delayed and substantially in phase,
  the second system sends at least one message to the first system,
  the clock signal received by the second system is sent back to the first system with said message sent by the second system, and
  the first system receives the message sent by the second system and the sent-back clock signal, delayed and substantially in phase.

The above method makes it possible to obtain a full-duplex synchronous serial link with a high speed without the delay induced by the routing of the data over the link preventing the first system and the second system from sampling the messages that they receive synchronously with the clock signal.

The link can simultaneously route the message sent by the second system to the first system and the clock signal sent back to the first system. These data arrive in phase at the first system. A substantially equal delay is applied by the link to the message sent by the second system to the first system and to the clock signal sent back to the first system. This delay can be the same as that applied by the link to the data routed from the first system to the second system. In a variant, the link can apply different delays from one direction of routing of the data to the other.

The first system can be master, i.e. it is the one that takes the initiative of triggering the communication with the second system, this second system then being slave.

In a variant, the first system is slave and the second system is master.

The full-duplex synchronous serial link is advantageously a link of Serial Peripheral Interface (SPI) type. In the context of the communication, the clock signal is generated by the first system.

The link can include three wires arranged between the first system and the second system and respectively routing the messages from the first system to the second system, the messages from the second system to the first system and the clock signal. A fourth wire can be provided between an area of the third wire and the first system to send back to the first system the clock signal received by the second system. Said area is particularly close to the second system, being particularly closer to the second system than to the first system. Said area can be found at the input, on the link side, of the second system. Said area can be positioned in such a way as to send back to the first system a clock signal substantially identical to that received by the second system.

Each wire can be unidirectional or otherwise.

In a first mode of implementation of the invention, galvanic isolation is interposed between the first system and the second system and the full-duplex synchronous serial link crosses this isolation. In such a case, the delay induced by the link on the data routed over the link is caused entirely or partly by this galvanic isolation. It can be a transformer, for example.

The galvanic isolation is for example multi-channel, and each wire of the link is received in one of the channels of the isolation.

In this first mode of implementation of the invention, the area of the third wire at which the fourth wire starts is arranged downstream of the galvanic isolation, when moving from the first system to the second system.

In a second mode of implementation of the invention, no galvanic isolation is crossed by the full-duplex synchronous serial link. The link has a length of above a few meters, for example three meters, and the delay induced by the link on the data routed by the latter is caused entirely or partly by the length of the link.

In this second mode of implementation of the invention, the area of the third wire at which the fourth wire starts can be closer, when the link is travelled, to the second system than to the first system. Said area of the third wire is particularly in the third, particularly quarter, particularly tenth, of the link closest to the second system, the link comprising three thirds, particularly four quarters, particularly ten tenths. The fourth wire can start on the third wire at the level of the input, on the link side, of the second system.

According to a third embodiment, the delay induced by the link on the data routed over this link is partly caused by the crossing of galvanic isolation and partly caused by the length of the link.

The method according to the invention can thus make it possible to ensure good operation of the link despite the relatively long delay that it can induce, this delay being particularly in the order of magnitude of a quarter of the period of the clock signal for the desired communication speed.

The full-duplex synchronous serial link preferably operates at a speed above or equal to 5 Mbits/s, particularly above or equal to 10 Mbits/s, being particularly equal to 20 Mbits/s. The period of the clock signal is particularly below 200 ns, particularly below 100 ns, being particularly in the order of 50 ns.

The first system can comprise a first half-duplex module in charge of transmitting data over the link and a second half-duplex module in charge of receiving data routed over the link.

The second system can comprise a full-duplex module in charge of communicating with the first system.

With such a first system and such a second system, a message is sent by the first system in phase with the clock signal. These data cross the galvanic isolation and remain substantially in phase given that the link, where applicable via the multichannel galvanic isolation, induces one and the same delay on these data, particularly on each wire. The full-duplex module of the second system reads the message that it receives with respect to the clock signal, these data being received in phase.

The full-duplex module of the second system can then send a message to the first system in phase with the clock signal that it has received and that it sends back to the first system. This message and the clock signal that are sent back cross the galvanic isolation and arrive delayed by the same delay at the second module of the first system. The second module of the first system then reads the message received with respect to the clock signal received.

Each module can receive a message in phase with the clock signal that it also receives, so that the first system and the second system can satisfactorily sample the data that they receive, even with a speed above 5 Mbits/s, particularly above 10 Mbits/s, for example equal to 20 Mbits/s.

According to the invention, when multichannel isolation is used, it is not necessary for this isolation to offer particular performances in terms of value of induced delay or of precision with respect to this delay value since this delay is compensated for by the sending back of the clock signal. The only constraint concerns the fact that, from one channel to another, a substantially equal delay is induced by the galvanic isolation for each direction of routing, or even for both directions of routing.

The first system can be master. When it is master, the first system can comprise a programmable logic circuit (FPGA). In this case, the second system is slave and it can comprise a microcontroller or microprocessor. In this case, four wires only can be used to produce the link, which means that when galvanic isolation is provided, only four wires have to be isolated. With respect to the link represented in FIG. 2, it is not necessary to have to isolate an additional wire linking the first system and the second system for the clocking of the communication, this clocking being carried out using the clock signal transmitted by the first module of the first system.

In a variant, the first system can be slave. When it is slave, the first system can comprise a microcontroller or a microprocessor and the second system is then master and can comprise an FPGA. In this case, it can be necessary to provide an additional wire for the clocking of the communication. Additional galvanic isolation, mounted in parallel with that crossed by the four wires above can then be provided between the first system and the second system.

The data routed over the link can comprise duty cycle values intended to be applied to the switches of an inverter and measured current values. The data routed over the link and other than the clock signal can be composed of the duty cycle values and the measured current values mentioned above. In a variant, the link can route other data in addition to the clock signals, duty cycle values and measured current values.

In one application of the method, one of the first system and the second system interacts with a generator of duty cycle values and the other of the first system and the second system interacts with an electrical circuit comprising an inverter and an electric motor.

The first system is for example master and interacts for example with the electrical circuit and the second system is for example slave and interacts with the generator of duty cycle values.

In a variant, the system that is slave interacts with the electrical circuit and the system that is master interacts with the generator of duty cycle values.

Another subject of the invention, according to another of its aspects, is a full-duplex synchronous serial link between at least one first system and at least one second system, the link comprising:
- a first wire running between said systems and allowing the transmission of a message or messages from the first system to the second system,
- a second wire running between said systems and allowing the transmission of a message or messages from the second system to the first system, and
- a third wire running between said systems and allowing the transmission of the clock signal generated by the first system to the second system, the link furthermore including a fourth wire linking an area of the third wire and the first system.

The fourth wire particularly allows the clock signal sent by the first system and received by the second system delayed by the link to be sent back to the first system, which makes it possible to obtain the advantages mentioned above.

All or part of the features mentioned above in relation to the communication method can be combined with the above definition of the link, particularly the features relating to the position of the area of the third wire at which the fourth wire starts.

Another subject of the invention, according to another of its aspects, is a communication system galvanically isolated between one first system and one second system, comprising:
- the link defined above, and
- galvanic isolation crossed by the link, said area of the third wire being arranged downstream of the isolation when the link is travelled from the first system in the direction of the second system.

The fourth wire allows the clock signal, which has undergone the same delay by crossing the isolation as the message sent by the first system to the second system, to be sent back to the first system and thus accompanies the message sent by the second system to the first system. This message and this clock signal are advantageously received in phase by the first system, delayed by one and the same delay equal or otherwise to the delay applied by the link to the data routed from the first system to the second system.

Another subject of the invention, according to another of its aspects, is an assembly comprising:
- the communication system defined above,
- a first master system, particularly comprising a programmable logic circuit (FPGA), and
- a second slave system, the link being devoid of any wire other than the first, second, third and fourth wire.

Another subject of the invention, according to another of its aspects, is an assembly comprising:
- the communication system defined above,
- a first slave system, particularly comprising a microcontroller or a microprocessor, and
- a second master system, the link including a fifth wire linking the first system and the second system and crossing the galvanic isolation.

The galvanic isolation can be produced using an isolator comprising five channels, in which case, one and the same isolator is crossed by the five wires.

In a variant, the galvanic isolation comprises two parts arranged in parallel, the first part being crossed by the first, second, third and fourth wires and the second part being crossed by the fifth wire.

In a variant, again the first and the third wire cross a first part of the isolation, this part inducing a first delay, and the second and the fourth wire cross a second part of the isolation, this second part inducing a second delay different to the first delay. The fifth wire can cross one or the other of these two parts of the isolation or a third part of the isolation separate from the first and second parts.

Figure 3:
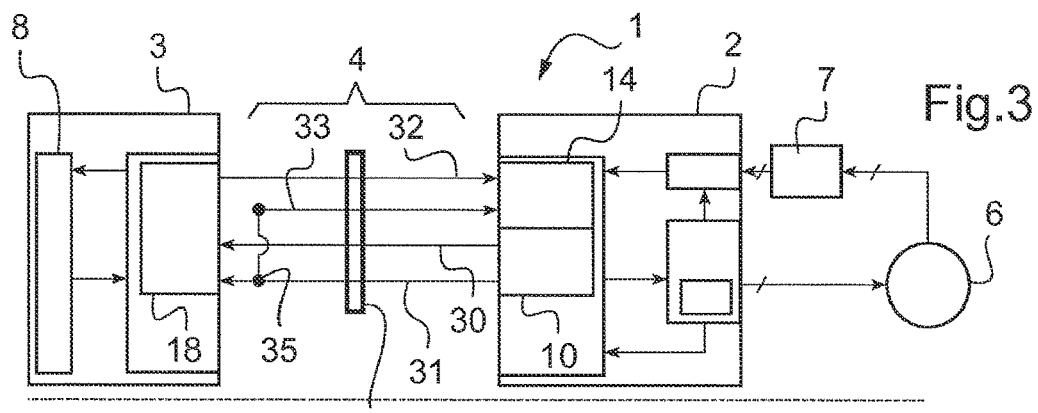
Figure 4:
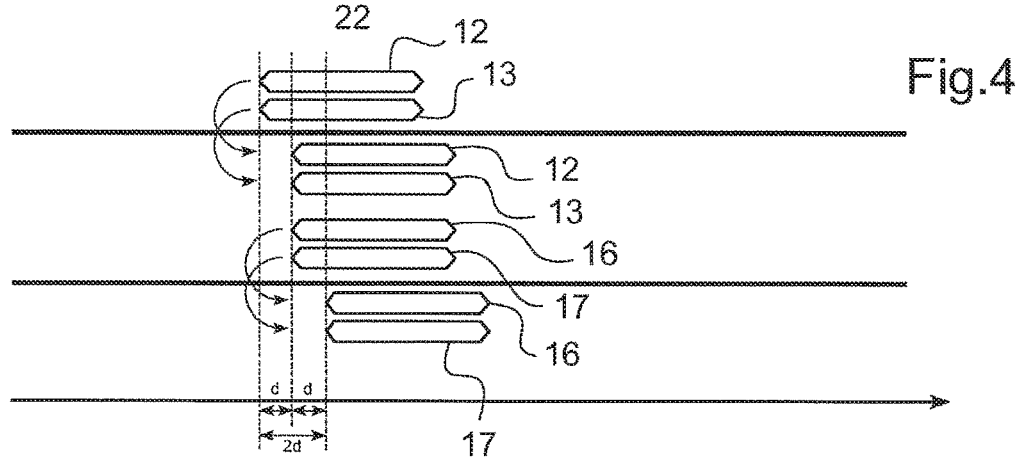
Figure 5:
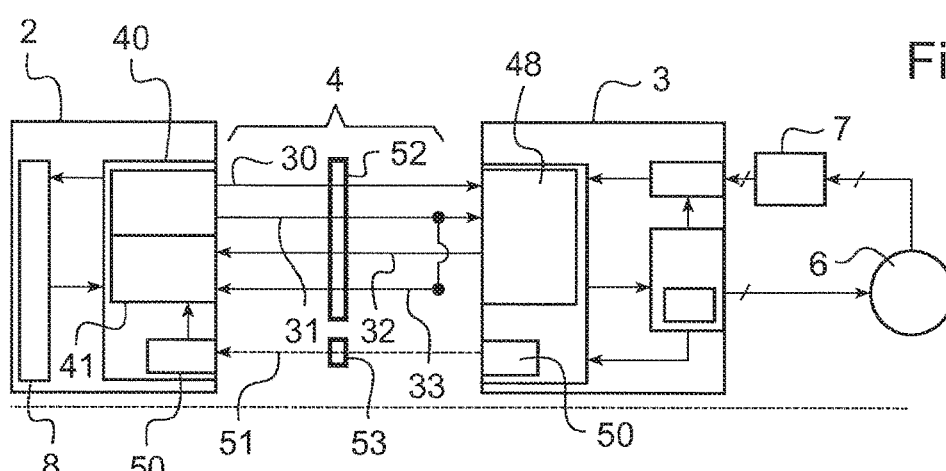
Figure 6:
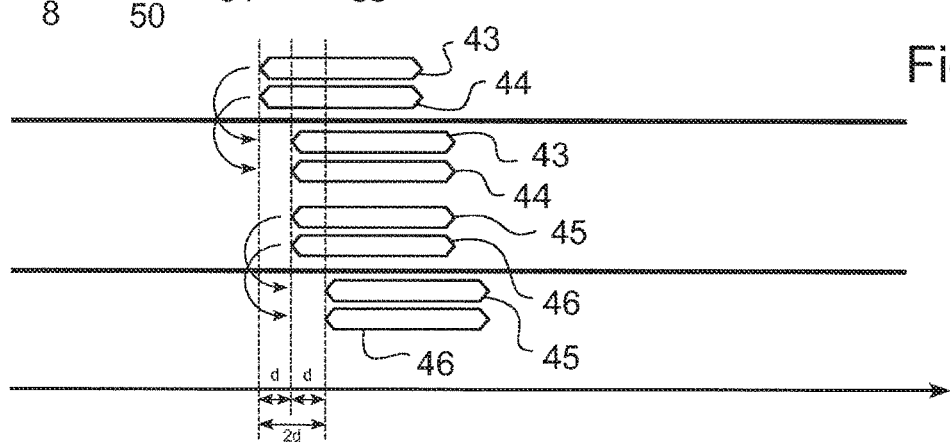

The invention will be better understood upon reading the following description of non-limiting exemplary embodiments of the latter, and upon examining the appended drawing in which:

FIGS. 1 and 2 represent a full-duplex synchronous serial link of the prior art already described, FIG. 3 represents an assembly according to a first embodiment of the invention, FIG. 4 illustrates a sequence of communication with the assembly in FIG. 3, FIG. 5 represents an assembly according to a second embodiment of the invention and, FIG. 6 illustrates a sequence of communication with the assembly in FIG. 5.

FIG. 3 represents an assembly 1 in which methods according to exemplary embodiments of the invention can be carried out.

The assembly 1 comprises in the example in FIG. 3 one first system 2 and one second system 3 exchanging data by way of a full-duplex synchronous serial link 4.

In the example under consideration, the assembly 1 is embedded in a vehicle that comprises an electrical circuit including an electric motor 6, a battery and an inverter interposed between the battery and the electric motor. The electrical circuit can comprise a connector making it possible to charge the battery by way of an electrical network.

The assembly 1 is in the example under consideration part of a device for driving the switches of the inverter.

The first system 2 is for example a peripheral interacting with the inverter to control the switches of the inverter and with the electric motor 6 to measure the current flowing through each phase of the stator of the motor 6, the latter being particularly multi-phase, for example three-phase.

The first system 2 sends for example duty cycle values to the switches of the inverter and receives, after passage through an analog/digital converter 7, values of the currents measured in the phases of the stator of the motor 6.

The second system 3 communicates in the example under consideration with a generator 8 of duty cycle values as a function of current values. This generator 8 employs a software process, for example.

The first system 2 is master in the example in FIGS. 3 and 4 and it is produced in this example using a programmable logic circuit (FPGA). The master system 2 comprises in this example two modules associated with the link 4, each module being a half-duplex module. A first module 10 is responsible for the sending of the message 12 to the second system 3 which is slave here and for the sending of a clock signal 13 with which the message 12 is synchronized.

A second module 14 is responsible for receiving the message 16 sent by the second system 3 and clock signals 17, as will be seen further on.

The link 4 can be of SPI type, in which case each module 10 and 14 is a half-duplex SPI controller.

The second system 3 comprises in the example under consideration a single module 18 associated with the link 4. This module 18 is a full-duplex module, sending messages 16 to the first system 2 and receiving the messages 12 sent by the first system. This module also receives the clock signal 13 generated by the first system 2. When the communication is carried out over a link 4 of PSI type, the module 18 is a full-duplex SPI controller.

In the example under consideration, the link 4 allows the sending by the first system 2 of current values to the second system 3 and the sending by the second system 3 of duty cycle values generated on the basis of these current values by the generator 8.

The link 4 is in the example in FIG. 3 composed of four wires 30 to 33. The wire 30 is responsible for the routing of the messages 12 from the first system 2 to the second system 3. The wire 31 is responsible for the routing of the clock signal generated by the first system 2 to the second system 3. The wire 32 is responsible for the routing of the messages 16 from the second system 3 to the first system 2. A fourth wire 33 is provided, this wire 33 linking an area 35 of the wire 31 and the first system 2. The fourth wire 33 plays the part of return for the wire 31.

In the example in FIG. 3, the first system 2 is galvanically isolated with respect to the second system 3. This galvanic isolation 22 is here produced by way of a transformer but the invention is not limited to a particular production of the galvanic isolation. The galvanic isolation 22 is in this example a multi-channel isolation, each wire 30 to 33 being received in a specific channel of the isolation 22.

As represented in FIG. 3, the area 35 of the wire 31 from which the fourth wire 33 runs can be situated downstream of the isolation 22 when the link 4 is travelled from the first system 2 in the direction of the second system 3. This area 35 is for example situated as close as possible to the second system 3, in such a way as to send back to the first system 2 a clock signal substantially identical to that received by the second system 3.

The sequence of communication illustrated in FIG. 4 with the assembly in FIG. 3 will now be described.

A message 12 is sent by the first system 2 which is master here via its module 10 to the second system 3 which is slave here. This message 12 is synchronized with a clock signal 13. The crossing of the galvanic isolation 22 generates a delay d which is substantially the same for the message 12 and the clock signal 13. In the examples described, one and the same delay d is applied by the link 4 to the data that it routes, independently of the direction of routing. In variants, not represented, one and the same delay d1 is applied by the link 4 to the data routed from the first system 2 to the second system 3, i.e. to the message 12 and to the clock signal 13, whereas a second delay d2, different to the first delay d1, is applied to the data routed from the second system 3 to the first system 2, i.e. to the message 16 and to the clock signal 17. This difference can be due to the use of different insulators from one direction of routing to the other.

The message 12 and the clock signal 13 then arrive in phase at the second system 3. The module 18 then reads the message 12 with respect to the clock signal 13.

A message 16 is sent back by the second system 3 to the first system 2. Owing to the presence of the fourth wire 33 in the link 4, a clock signal 17, which actually corresponds in the example under consideration to the clock signal 13 received by the module 18, is sent to the first system 2. This clock signal 17 is in phase with the message 16 sent by the second system 3. The crossing of the galvanic isolation 22 induces on the message 16 and the clock signal 17 a delay d that is substantially equal for these two data, and which is also in the example under consideration substantially equal to the delay induced by the galvanic isolation 22 during the routing from the first system 2 to the second system 3 of the message 12 and of the clock signal 13.

The clock signal 17 and the message 16 then arrive in phase at the first system 2. The module 14 then proceeds with the reading of the message 16 with respect to the clock signal 17.

As can be seen in FIG. 4, the clock signal 17 is, in the example described, delayed by twice the delay induced by the link 4 when it is received by the module with respect to the clock signal 13 initially transmitted by the module 10 but this delay does not disturb the reading of the message 16 by the module 14.

We will now describe, with reference to the FIGS. 5 and 6, an assembly 1 according to a second embodiment of the invention.

This assembly 1 differs from that represented in FIG. 3 by the fact that the first system 2 generating the clock signal is slave whereas the second system 3 is master. Furthermore, the first system 2 interacts with the generator 8 of duty cycle values whereas the second system 3 interacts with the electric motor 6 and with the analog-to-digital converter 7.

The first system 2 comprises in this example a microcontroller including two half-duplex modules 40 and 41, the first half-duplex module 40 being in charge of sending messages 43 and a clock signal 44 to the second system 3 whereas the second half-duplex module 41 is in charge of receiving messages 45 sent by the second slave system and a clock signal 46.

The second system 3 comprises in the example in FIG. 5 an FPGA including a single full-duplex module 48 in charge of communicating over the link 4.

As represented in FIG. 5, each system 2 or 3 comprises in this example a synchronization module 50. Still in this example, the link comprises a fifth wire 51 and the galvanic isolation is in two parts, a first multi-channel part 52 is similar to the isolation 22 in FIG. 3 and crossed by the wires 30 to 33 whereas a second isolation 53 is dedicated to the isolation of the fifth wire 51. This fifth wire 51 and the modules 50 allow the second system 3, which is master here, to clock the communication.

As represented in FIG. 6, similarly to that which has been described with reference to FIG. 4, the first system 2 sends a message 43 and a clock signal 44 that are received by the second system 3 in phase and delayed by a substantially equal delay d. The second system 3 sends back a message 45 that is accompanied by a clock signal 46 generated using the return formed by the fourth wire 33. The first system 2 then receives via its second module 41 the message 45 and the clock signal 46 once again delayed by one and the same delay, here equal to the delay d, and can read the message 45 with respect to the clock signal 46.

The invention is not limited to the examples that have just been described.

In particular, as mentioned above, the invention does not necessarily imply that the link applies to the data routed from the first system to the second system a delay equal to that which the link applies to the data routed from the second system to the first system.

The expression "including a" or "comprising a" must be understood to mean "including at least one" or "comprising at least one" except when the opposite is specified.

The invention claimed is:

1. A method for communicating between at least one first system and at least one second system by way of a full-duplex synchronous serial link being able to simultaneously route between said systems data comprising:
    at least one message from the first system to the second system;
    at least one message from the second system to the first system; and
    a clock signal,
    wherein a galvanic isolation is interposed between the first system and the second system and wherein the full-duplex synchronous serial link crosses the galvanic isolation, the method comprising:
    receiving, by the second system, a message and a clock signal sent by the first system, delayed and in substantially phase, said message being transmitted through a first wire of the full-duplex synchronous serial link, and said clock signal being transmitted through a third wire of the full-duplex synchronous serial link;
    sending, by the second system, a message to the first system, through a second wire of the full-duplex synchronous serial link;
    sending back the clock signal received by the second system to the first system through a fourth wire of the full-duplex synchronous serial link, with said message sent by the second system through the second wire of full-duplex synchronous serial link; and
    receiving, by the first system, the message sent by the second system through the second wire of the full-duplex synchronous serial link, and the sent-back clock signal through the fourth wire of the full-duplex synchronous serial link, delayed and in phase,
    wherein the fourth wire links an area of the third wire and the first system, said area of the third wire being arranged downstream of the galvanic isolation when the link is travelled from the first system in the direction of the second system,
    wherein the galvanic isolation comprises a first part and a second part arranged in parallel,
    wherein the first part of the galvanic isolation is crossed by the first, second, third, and fourth wires, and
    wherein the second part of the galvanic isolation is crossed by a fifth wire.

2. The method as claimed in claim 1, wherein the link is a link of Serial Peripheral Interface (SPI) type.

3. The method as claimed in claim 1, wherein the first system is master and wherein the second system is slave.

4. The method as claimed in claim 1, wherein the full-duplex synchronous serial link has a speed in the range of 5 Mbits/s to 20 Mbits/s.

5. The method as claimed in claim 1, wherein the first system comprises a first half-duplex module in charge of transmitting data over the link and a second half-duplex module in charge of receiving data routed over the link.

6. The method as claimed in claim 1, wherein the second system comprises a full-duplex module in charge of communicating with the master system.

7. The method as claimed in claim 1, wherein the first system is master and comprises a programmable logic circuit (FPGA).

8. The method as claimed in claim 1, wherein the first system is slave and comprises a microcontroller or a microprocessor.

9. The method as claimed in claim 1, wherein the data routed over the link comprise duty cycle values intended to be applied to switches of an inverter and measured current values.

10. The method as claimed in claim 9, wherein one of the first system and the second system interacts with a generator of duty cycle values and the other of the first system and the second system interacts with an electrical circuit comprising an inverter and an electric motor.

* * * * *